Figure 1:
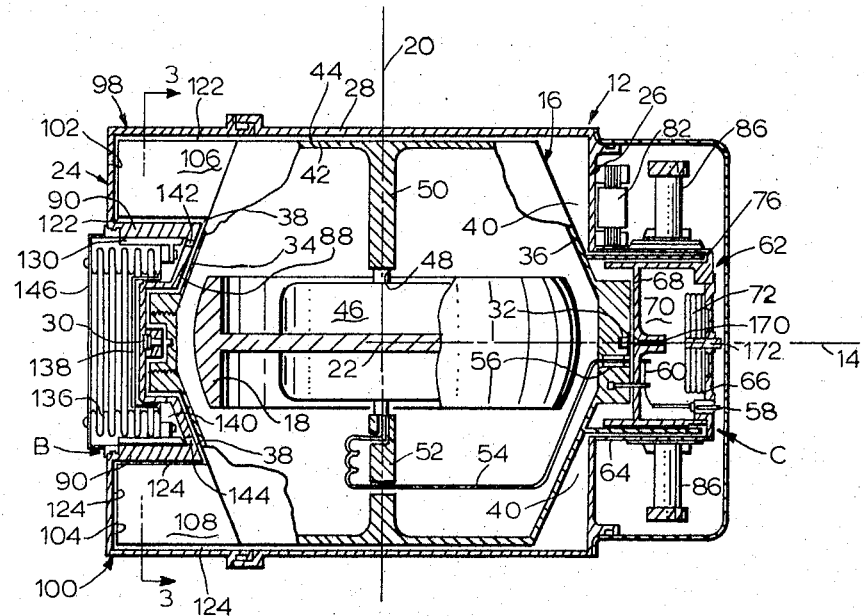

Nov. 21, 1967  C. I. TIPLITZ ET AL  3,353,415
GYRO DAMPING CONTROL

Filed May 8, 1964  2 Sheets-Sheet 1

CHARLES I. TIPLITZ
WALTER J. KRUPICK
INVENTORS

BY
Thomas W. Kennedy
ATTORNEY

Nov. 21, 1967　　C. I. TIPLITZ ET AL　　3,353,415
GYRO DAMPING CONTROL
Filed May 8, 1964　　2 Sheets-Sheet 2
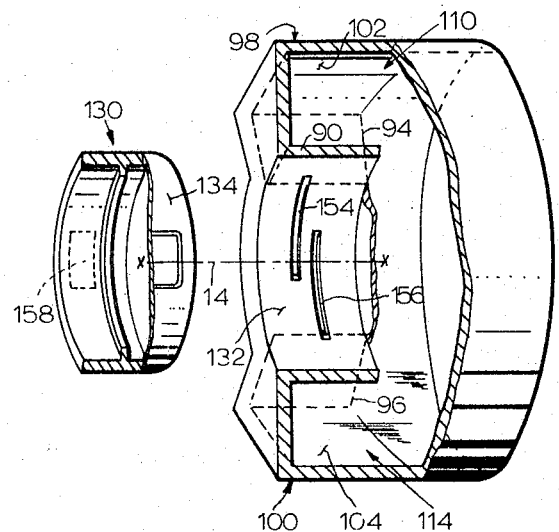
FIG. 4
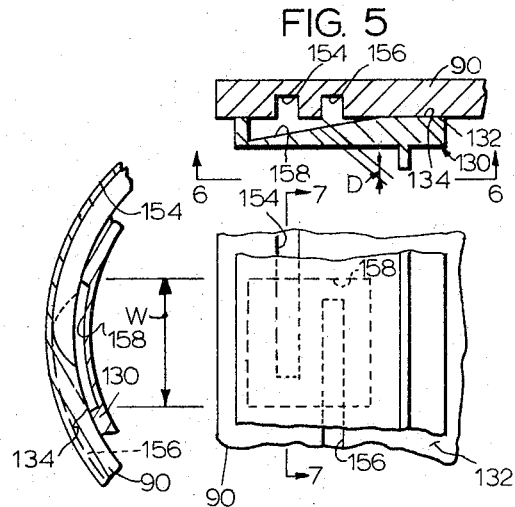
FIG. 5
FIG. 7
FIG. 6
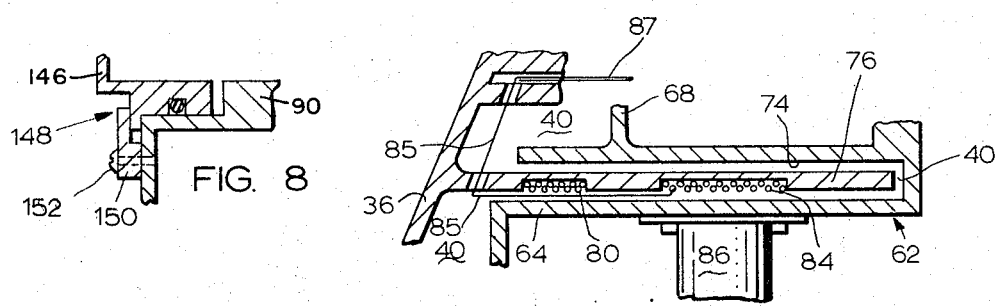
FIG. 8
FIG. 9
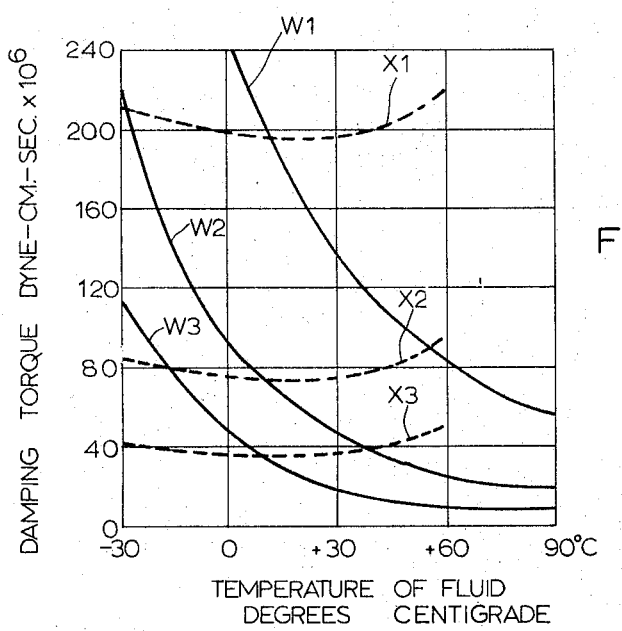
FIG. 10
CHARLES I. TIPLITZ
WALTER J. KRUPICK
INVENTORS
BY Thomas W. Kennedy
ATTORNEY

United States Patent Office 3,353,415
Patented Nov. 21, 1967

3,353,415
GYRO DAMPING CONTROL

Charles I. Tiplitz, Cedar Grove, and Walter J. Krupick, Succasunna, N.J., assignors to General Precision Inc., Little Falls, N.J., a corporation of Delaware
Filed May 8, 1964, Ser. No. 366,063
12 Claims. (Cl. 74—5.5)

The present invention relates to a fluid-damped gyro and particularly to a fluid-damped gyro having an adjustable damping control which maintains constant damping at various temperatures.

The advantages of fluid-damped gyros are well known. With such gyros, in order to maintain a constant damping under a wide variation in temperature, a hydro-mechanical damping control can be used.

In the prior art, such damping controls included at least two fluid-filled chambers with an interconnecting passage having an adjustable-area orifice. In one such prior-art device, per U.S. Patent No. 2,864,256, a radially movable gate and its connecting, axially movable plunger driven by an axially movable, temperature-sensitive bellows varies the orifice opening in a radial direction. In a second prior-art device, per U.S. Patent No. 2,955,472 assigned to the same assignee as the present invention, an axially movable shutter or blade driven by an axially movable, temperature-sensitive bellows varies the orifice opening in an axial direction. In a third such prior-art device, per U.S. Patent No. 2,834,213, a rotatable disc driven by a temperature-sensitive spring varies the orifice opening in a peripheral direction. Such prior-art devices work well over a limited temperature range at a single constant level of damping torque using a limited range of orifice area and a specific type of damping fluid.

However, with such prior-art devices, it is difficult to adjust the orifice area and to calibrate the damping control after manufacturing assembly due to varying manufacturing tolerances; and it is difficult to re-calibrate such controls for a different design torque level or a different design temperature range, or to re-calibrate for a damping fluid of a different viscosity.

In accordance with one embodiment of the present invention, such inherent limitations of the prior-art devices are eliminated by varying the orifice opening in two mutually perpendicular directions in a damping control device comprising a casing having a cylindrical surface with a port and a concentric ring member having a cylindrical surface with an orifice overlapping the port, which is driven axially by a temperature-sensitive bellows to vary the radial dimension or depth of the orifice opening and which is externally rotatable to adjust the peripheral dimension or width of the orifice opening, thereby providing a wide range of orifice areas and a large family of levels or curves of damping torque versus temperature.

Accordingly, it is one object of the invention to provide a gyro damping control device which maintains constant damping torque over varying temperatures and is adjustable externally to different levels of constant damping torque.

It is another object of the invention to provide an improved hydro-mechanical damping control for an inertial guidance device, which is rugged, sensitive, light-weight, and friction-free.

It is a further object of the invention to provide the aforementioned device in combination with an auxiliary bellows which is adjustable to pre-load the primary bellows and to pre-position its ring member, thereby pre-setting the axial dimension of the orifice opening during initial gyro-damping calibration.

To the fulfillment of these and other objects, the invention provides a fluid-damped gyro comprising a casing containing damping fluid and having inner recesses, and a float rotatable relative to the casing about a common axis having paddles respectively fitting the recesses. Each paddle forms two chambers varying oppositely in volume with float rotation. The casing has an annular wall with separate ports connecting to each chamber. The annular wall has a concentric ring movable relative thereto in an axial direction and in a peripheral direction. The ring has return passages for interconnecting, in pairs, chambers varying oppositely in volume. Each return has an orifice port having a length that varies with the axial movement of the ring, and having a width that varies with the peripheral movement of the ring. In this way, the fluid flow through the returns can be changed, either by rotating the ring or by axially displacing the ring. Thus, the gyro provides a variety of damping torque levels, each level having constant viscous damping with variation in fluid temperature.

Figures 2, 3:
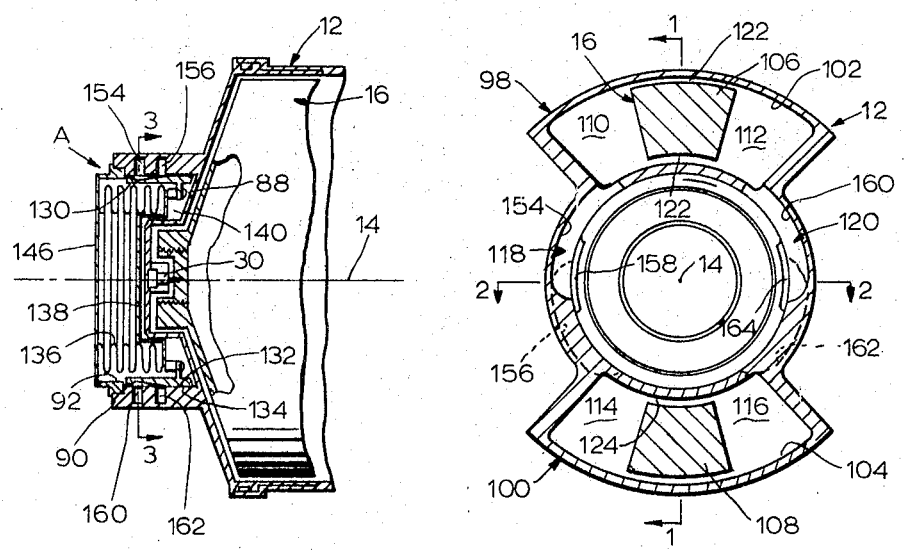

Other objects of the invention will become apparent upon reading the annexed detail description in connection with the drawings wherein like parts are designated by like numerals throughout the several views, and wherein:

FIG. 1 is a sectional view of a fluid-damped gyro embodying features of the present invention;
FIG. 2 is a sectional view taken on line 2—2 of FIG. 3;
FIG. 3 is a sectional view taken on line 3—3 of FIG. 1;
FIG. 4 is an exploded, perspective view of a cut-away end portion of the gyro;
FIG. 5 is an enlarged view of portion A of FIG. 2;
FIG. 6 is a sectional view taken on line 6—6 of FIG. 5;
FIG. 7 is a sectional view taken on line 7—7 of FIG. 6;
FIG. 8 is an enlarged view of portion B of FIG. 1;
FIG. 9 is an enlarged view of portion C of FIG. 1; and
FIG. 10 is a graph of damping torque versus temperature.

Referring to FIG. 1, one embodiment of the present invention is a gyro 10, which is a single-degree-of-freedom, floated type of gyro. Gyro 10 comprises an outer body or casing 12 having an output axis 14, an inner body or float 16, which is floated in a damping fluid contained in casing 12 and rotates relative to said casing about axis 14, and a rotor 18 having a spin axis 20, the axis being substantially at right angles to axis 14. Gyro 10 also has a third or input axis 22, which is substantially at right angles to a plane including axis 14 and axis 20. Rotation about input axis 22 causes a gyroscopic precession about output axis 14.

Casing 12 has a pair of end walls 24, 26, axially spaced along axis 14, and a peripheral wall 28, preferably of cylindrical shape. End wall 24 has a pivot means 30, and end wall 26 has a second pivot means 32; the pivots 30, 32 are preferably conventional, jewel-type bearings. Pivots 30, 32 are co-axial along axis 14 with each other and with casing 12 and float 16.

Float 16 has a pair of end walls 34, 36, axially spaced along axis 14, respectively adjacent walls 24, 26, and separated therefrom by end gaps 38, 40, which are filled with damping fluid. Float 16 also has a peripheral wall 42, preferably cylindrical in shape, co-axial with wall 28 along axis 14, and separated therefrom by an annular gap 44, which is also filled with damping fluid. For ease of illustration, the sizes of gaps 38, 40 and 44 have been exaggerated in the drawings. In one example of this embodiment, each of the gaps 38, 40 and 44 was about 30/1000 of an inch in width.

Rotor 18 is driven by and supported by a motor 46, having an axle 48 supported at each end from the radially inner face of wall 42. Motor 46 and axle 48 are co-axial with rotor 18 along axis 20. Float 16 has wall portions 50, 52 projecting radially inwardly from wall 42 on opposite sides of rotor 18, respectively supporting the ends of axle 48. Motor 46 has a conductor 54 (FIG. 1), extending through wall portion 52. Conductor 54 has a terminal 56 in wall 36, and another terminal 58 in wall 26, the terminals 56, 58 being interconnected by a flexible lead 60.

Wall 26 has a protruding portion or cup 62 of cylindrical shape which projects axially outwardly from the remainder of wall 26. Cup 62 is also co-axial with float 16 with respect to axis 14, closed on its axially outer side and open on its axially inner side. Cup 62 has a cylindrical wall 64, and an end plate 66 closing its axially outer side. Cup 62 also has a partition plate 68, integral with cylindrical wall 64 and axially spaced inwardly of plate 66, forming a chamber 70 inside cup 62 for containing damping fluid. Chamber 70 communicates with end gap 40 by conduits (not shown), to permit passage of fluid therebetween. End plate 66 has an auxiliary bellows 72, which is fixedly connected to the axially inner side of said end plate. Bellows 72 extends into chamber 70. Bellows 72 will be described hereafter in more detail.

Wall 26 has an annular groove 74 on its axially inner side. Groove 74 has a deep, narrow cross-section, extending inside cup wall 64 (FIGS. 1 and 9). Wall 36 has an annular flange 76 received with clearance inside groove 74. Flange 76 is on the axially outer side of wall 36, projecting axially outwardly therefrom, and is also co-axial with cup wall 64 and groove 74 about axis 14, and also rotates relative to wall 64.

Gyro 10 also has pick-off secondary coil 80 (FIGS. 1 and 9), which is wrapped around the radially outer surface of flange 76; gyro 10 also has a pick-off primary coil 82 cooperating with coil 80, mounted on the radially outer side of cup wall 64 for measuring the rotary displacement of float 16 from its null position relative to casing 12.

Gyro 10 also has a torquer coil 84, which is wrapped around the radially outer surface of flange 76, and is spaced axially outwardly of and insulated from pick-off coil 80. Gyro 10 also has a torquer magnet assembly 86 cooperating therewith, mounted on the radially outer side of cup wall 64 and spaced axially outwardly of pick-off coil 82, for applying a torque to float 16 to return it to its null position. Coils 80, 84 have conductors, one of which, 85, is shown in FIG. 9 with a terminal 87.

The other end wall 24 has a conical portion 88 (FIG. 2); pivot 30 is mounted in the apex of said conical portion 88. Wall 24 also has an annular wall portion 90 (FIGS. 1 and 2), extending axially outwardly from conical portion 88, forming a cylindrical outer recess 92 therein. The axially inner side of the conical portion 88 has two openings 94, 96 (FIG. 4), which are closed over by two box portions 98, 100 (FIGS. 3 and 4) to form two diametrically-opposite, arcuate, inner recesses 102, 104 containing damping fluid communicating with gaps 38.

Float 16 has two diametrically-opposite, outwardly-extending, integral paddles or vanes 106, 108 (FIG. 1), respectively fitted in inner recesses 102, 104, forming four variable-volume chambers 110, 112, 114, 116 (FIG. 3). Chambers 110, 114 are connected by first chamber passage 118; and chambers 112, 116 are connected by second chamber passage 120. Paddles 106, 108 are separated from the walls of their arcuate recesses 102, 104 by gaps 122, 124, respectively. The gaps 122, 124 are small in size to minimize leakage between chambers. In one sample of this embodiment of gyro 10, the size of each gap 122, 124 was approximately 0.01 of an inch.

Annular wall 90 supports a ring member 130 (FIG. 4). Wall 90 has a cylindrical, radially inner surface 132, which is concentric with and is in sliding engagement with a cylindrical, radially outer face 134 on ring 130, so that ring 130 is axially and rotatably movable relative to wall 90.

Ring 130 is connected to a primary bellows 136, co-axial therewith. Bellows 136 has an axially-inner end plate 138 forming a chamber 140 with fluid therein connected by conduits 142, 144 to gaps 38. Bellows 136 also has an axially-outer end plate 146 with adjustable connections 148 to wall 90. Each connection 148 preferably includes a clamp 150, or the like (FIG. 8), overlapping the edge of end plate 146, and has machine screws 152, or the like, connecting clamp 150 to the edge of wall 90.

Passage 118 includes two passage grooves 154, 156 disposed in inner surface 132 in axially-spaced, parallel arrangement (FIG. 4), which are sealed over by outer face 134. Passage 118 also has a passage recess 158 disposed in outer face 134, which is sealed over by inner surface 132. Passage recess 158 interconnects passage grooves 154, 156. Passage groove 154 opens into chamber 110, and passage groove 156 opens into the other chamber 114, so that fluid can flow through passage groove 154 (FIG. 7) from chamber 110 through passage recess 158, and then through passage groove 156 to chamber 114.

Passage 120 is diametrically opposite to the passage 118, and similarly includes two passage grooves 160, 162 disposed in inner surface 132 (FIGS. 2 and 3). Passage 120 has a passage recess 164 disposed in ring outer face 134, interconnecting passage grooves 160, 162. Similarly, passage groove 160 opens into chamber 112 (FIG. 3), and passage groove 162 opens into the other chamber 116 so that fluid can flow therebetween.

Each of the passage recesses 158, 164 is preferably deeper at its axially outer end than at its axially inner end; and preferably has a triangular profile in axial cross-section (FIG. 5), a rectangular, arcuate profile in transverse cross-section (FIG. 7), and a rectangular profile in exterior plan view (FIG. 6). With this construction, the cross-section of each recess 158, 164 varies independently in two mutually perpendicular dimensions, when ring 130 is move in an axial direction and also when ring 130 is rotated relative to wall 90. That is, the depth of each recess 158, 164 varies with axial ring movement (FIG. 5); and the arcuate width of each recess varies wtih rotary adjustment (FIG. 7). Thus, an orifice effect is provided at each recess 158, 164 when ring 130 moves either peripherally or axially relative to wall 90. As a result, a family of performance levels or curves of damping torque versus axial ring movement can be obtained, in which each level or curve represents one width setting. In addition, each level or curve of damping torque can be held constant over a wide temperature range, since the orifice variation can be calibrated to offset the fluid viscosity variation with temperature.

Auxiliary bellows 72 is limited in its axial travel by a fixed stop 170 disposed on partition 68, and is limited in travel in its other direction by an axially-adjustable screw 172, fitted in a tapped hole in end plate 66. Screw 172 can move bellows 72 to adjust the gyro volume. During gyro manufacture, damping fluid is normally added in a controlled environment, after which the gyro is sealed; and if there is an over-supply or under-supply of fluid in the gyro, bellows 72 can change or adjust the volume of the gyro. Since bellows 72 can be adjusted externally by turning screw 172 the problem of gyro disassembly is avoided. In addition, bellows 72 can bring primary ring bellows 136 to its design starting point, thereby setting the desired recess depth D (FIG. 5), for the design starting temperature thereby facilitating the calibration of the gyro. Moreover, bellows 72 preferably has a higher and stiffer spring rate and is less sensitive than bellows 136. In the operation of one sample of embodiment 10, at room temperature and higher, bellows 72 is urged in contact against screw 172, while at a temperature of about minus 65° F., bellows 72 remains in contact against opposite stop 170. In this way, bellows 72 obviously operates over a different temperature range than bellows 136 thereby extending the range of the gyro performance level and its curve of damping torque versus temperature.

FIG. 10 shows three curves W1, W2, W3 typical of a larger family of performance levels or curves obtained in testing one sample of an embodiment of gyro 10. By adjusting ring 130 in a peripheral direction, the orifice width W (FIGS. 6 and 7) of the test gyro was varied for three different settings of width. The highest damping curve W1 (FIG. 10), corresponds to the smallest width W setting. Specifically, W1 curve corresponds to 0.2 inch width orifice, W2 to 0.5 inch width and W3 to 1.0 inch width using the same depth of orifice. For comparison, at each of the width settings, the orifice depth D (FIG. 5) was varied by moving the ring 130 in the same manner in an axial direction, corresponding to the same temperature change of the damping fluid, thereby providing a new curve of substantially constant torque versus fluid temperature for each width orifice. The three curves X1, X2, X3 in FIG. 10 show in comparison the constant-torque curves respectively corresponding to the variable-torque curves W1, W2, W3. Each of the constant-torque curves X1, X2, X3 has its particular, substantially constant, damping-torque level for its particular orifice-width setting during a variation in its fluid temperature and in its orifice depth D. The test data of FIG. 10 shows the different levels of substantially constant, damping torque possible under varying temperatures, using the gyro damping control according to the invention.

While the present invention has been described in a preferred embodiment, it will be obvious to those skilled in the art that various modifications can be made therein and within the scope of the invention. One such modification is the addition of another set of diametrically opposite recesses in ring outer face 134, offset 90° from recesses 158, 164, which can be used in place of recesses 158, 164 to give an alternate set of performance curves. Another such modification is the addition of a loop spring to provide rotative adjustment of the orifice setting automatically, similar to the spring in an aforementioned U.S. Patent No. 2,834,213, thereby giving another, entirely-new set of performance curves. Another such modification is the arrangement of ring 130 on the radially outer side of wall 90 instead of on the radially inner side, which can facilitate adjustment of the ring in some types of gyros. It is intended that the appended claims cover all such modifications.

What is claimed is:

1. A fluid-damped gyro comprising:
a casing adapted to contain a damping fluid and including an annular wall;
means defining a plurality of recesses within said casing;
a float within said casing rotatable relative thereto about a common axis, said float having paddles respectively fitting into the recesses, each paddle coacting with its respective recess to form two chambers varying oppositely in volume with float rotation;
means defining in said annular wall a plurality of separate ports each connecting to one of said chambers;
a concentric ring axially and rotatively displaceable relative to said annular wall and containing fluid return pasages for interconnecting in pairs chambers varying oppositely in volume, each return passage having an orifice one dimension of which varies with axial movement of said ring and another dimension of which varies with rotational movement of said ring, thus to vary the fluid flow through said return passages either by rotating the ring or by axially displacing the ring thereby providing a variety of damping torque levels, each level having a constant viscous damping torque with variation in fluid temperature.

2. A fluid-damped gyro as claimed in claim 1, including spring means for displacing the ring in at least one direction of movement in response to variation in the temperature of the damping fluid.

3. A fluid-damped gyro as claimed in claim 2, including means to pre-load the spring means.

4. A fluid-damped gyro as claimed in claim 2, in which the spring means is an axially movable bellows mounted on the ring and adjustably connected to the casing to control fluid flow through the orifices for maintaining constant damping torque for variable temperatures.

5. A fluid-damped gyro as claimed in claim 4, in which the connection of the bellows to the casing is disposed on the outer face of the casing and is adapted for rotating the bellows for adjusting the angular orientation of the ring relative to the annular wall from the exterior of the casing.

6. A fluid-damped gyro as claimed in claim 4, in which the pre-load means is an auxiliary bellows with a different spring rate than the ring bellows for calibrating and for pre-setting the ring bellows from the exterior of the casing.

7. A device for damping the movement of a mass comprising:
a casing containing the mass to be damped and a quantity of damping fluid;
a fluid-impelling member disposed in the fluid and connected for movement with the mass;
an annular member with a surface portion in sliding engagement with an adjacent surface portion of the casing and movable relative thereto in two different directions substantially perpendicular to one another;
means defining a first passage in the casing with an opening in the casing surface portion;
means defining a second passage in the plate with an opening in the plate surface portion;
said passage openings being at least in partial registration to form a variable orifice establishing flow communication between said two passages, whereby the cross-sectional dimensions of the orifice are adjustable independently of one another in two mutually perpendicular directions.

8. A device as claimed in claim 7, in which the casing has an annular wall portion and the plate has a ring concentrically mounted on the annular wall portion.

9. A device as claimed in claim 8, in which the ring is disposed radially inwardly of said annular wall portion.

10. A device as claimed in claim 7, including means for reciprocating the plate and varying the orifice dimension in one of said directions in response to variation in the fluid temperature, said reciprocating means being adjustable in the other direction for pre-setting the orifice dimension in the other of said directions.

11. A device as claimed in claim 10, in which the reciprocating means is a bellows adjustably connected to the casing exterior.

12. A floated type of single-degree-of-freedom-gyro comprising:
a casing having a peripheral wall with an output axis and a pair of axially spaced end walls containing damping fluid;
a float coaxially and pivotally supported in the casing for oscillatory rotation about the output axis relative to the casing;
a rotor with a spin axis disposed substantially at right angles to the output axis, mounted in the float and having an input axis substantially at right angles to a plane including the output axis and the spin axis;
a plurality of recesses on the inner surface of said casing adjacent one end wall;
a plurality of paddles on the outer surface of said float, each paddle respectively fitted with clearance in one of said recesses forming a pair of chambers in each recess varying oppositely in volume with float rotation;
an annular wall adjacent said end wall of the casing forming a portion of each recess on its radially outer side and having a cylindrical surface on its radially inner side;
a ring member having a cylindrical surface concentric with said cylindrical wall surface about said output axis and in sliding engagement therewith;
a plurality of chamber passages, each interconnecting to peripherally adjacent chambers and comprising a passage portion connecting to each of its chambers disposed in the annular wall and a return recess portion interconnecting the ends of the two passage portions disposed in the ring to form a passage orifice varying in size with axial ring movement or with rotary ring movement;

a primary bellows rotatably and adjustably connected at one end to said end wall adjacent the recesses and fixedly connected to the ring member at its other end for axially moving the ring with variable fluid temperature to provide constant damping torque with variable fluid temperature and to provide an external adjustment for changing the level of the damping torque; and a secondary bellows fixedly connected to the other end wall of the casing, axially adjustable for pre-setting the primary bellows and for calibrating its orifices.

References Cited

UNITED STATES PATENTS 2,834,213  5/1958  Fredericks _____ 74—5.5
3,113,594  12/1963  Trempler _____ 74—5.5 X FRED C. MATTERN, JR., *Primary Examiner.*

PALMER W. SULLIVAN, *Examiner.*

J. D. PUFFER, J. C. HUSAR, *Assistant Examiners.*